(12) United States Patent
Wu et al.

(10) Patent No.: US 11,372,302 B2
(45) Date of Patent: Jun. 28, 2022

(54) DISPLAY PANEL, DISPLAY DEVICE, AND CONTROL METHOD THEREOF

(71) Applicant: Xiamen Tianma Micro-Electronics Co., Ltd., Xiamen (CN)

(72) Inventors: Xiaoxiao Wu, Xiamen (CN); Yingping Chen, Xiamen (CN); Bingping Liu, Xiamen (CN)

(73) Assignee: Xiamen Tianma Micro-Electronics Co., Ltd., Xiamen (CN)

( * ) Notice: Subject to any disclaimer, the term of this patent is extended or adjusted under 35 U.S.C. 154(b) by 0 days.

(21) Appl. No.: 17/196,767

(22) Filed: Mar. 9, 2021

(65) Prior Publication Data
US 2022/0171225 A1    Jun. 2, 2022

(30) Foreign Application Priority Data
Nov. 30, 2020    (CN) .......................... 202011372090.9

(51) Int. Cl.
*G02F 1/1368* (2006.01)
*G02F 1/1362* (2006.01)
*G06V 40/13* (2022.01)

(52) U.S. Cl.
CPC ...... *G02F 1/1368* (2013.01); *G02F 1/136222* (2021.01); *G02F 1/136286* (2013.01); *G06V 40/1306* (2022.01)

(58) Field of Classification Search
CPC ............. G02F 1/1368; G02F 1/136222; G02F 1/136286; G06V 40/1306
See application file for complete search history.

(56) References Cited

U.S. PATENT DOCUMENTS

| 10,320,962 | B1* | 6/2019 | Chang | ................... G06F 3/1423 |
| 2016/0037095 | A1* | 2/2016 | Wu | .................... G06V 40/1318 |
| | | | | 348/241 |
| 2020/0134281 | A1* | 4/2020 | Han | ........................ G06F 3/017 |
| 2021/0020810 | A1* | 1/2021 | Lius | ........................ G06F 21/32 |

FOREIGN PATENT DOCUMENTS

| CN | 107068730 | A | | 8/2017 | | |
| CN | 109521586 | A | * | 3/2019 | ............. | G02F 1/133 |
| CN | 109522697 | A | * | 3/2019 | ............. | G06F 21/32 |
| CN | 109522697 | A | | 3/2019 | | |
| CN | 208954536 | U | | 6/2019 | | |
| CN | 111293159 | A | * | 6/2020 | | |
| CN | 110649080 | B | * | 10/2021 | ........... | G09G 3/3225 |
| TW | I737424 | B | * | 8/2021 | | |

* cited by examiner

*Primary Examiner* — Ricardo Osorio
(74) *Attorney, Agent, or Firm* — Anova Law Group, PLLC

(57) ABSTRACT

A display panel is provided with a display region and a non-display region, and includes a plurality of sub-pixels, located in the display region; a plurality of fingerprint recognition units, located in the display region; and ambient-light sensing units, including at least one first light-sensing unit. At least a part of the plurality of fingerprint recognition units is multiplexed as the at least one first light-sensing unit.

19 Claims, 14 Drawing Sheets

US 11,372,302 B2

DISPLAY PANEL, DISPLAY DEVICE, AND CONTROL METHOD THEREOF

CROSS-REFERENCES TO RELATED APPLICATIONS

This application claims the priority of Chinese patent application No. 202011372090.9, filed on Nov. 30, 2020, the entirety of which is incorporated herein by reference.

FIELD OF THE DISCLOSURE

The present disclosure generally relates to the field of display technology and, more particularly, relates to a display panel, a display device, and a control method thereof.

BACKGROUND

From the cathode ray tube (CRT) display era to the liquid crystal display (LCD) era, and to the current organic light-emitting diode (OLED) display era, the display industry has experienced decades of development and has become rapidly changing. The display industry has been closely related to our lives, and display has also become an essential technology for many daily-use devices, e.g., from traditional mobile phones, tablets, televisions, and personal computers (PCs) to the current electronic devices such as smart wearable devices, virtual reality (VR), etc.

In order to meet the needs of consumers, electronic devices now have more and more functions. Among these functions, an identity recognition function has now generally adopted by electronic devices. Compared with the conventional digital password recognition method, fingerprint recognition has become a major method for current electronic device to implement identity recognition due to its advantages such as high security and convenience in use. However, the fingerprint recognition component in current electronic device may only be used for fingerprint image acquisition. The disclosed display panel, display device, and control method are directed to solve one or more problems set forth above and other problems in the art.

BRIEF SUMMARY OF THE DISCLOSURE

One aspect of the present disclosure provides a display panel. The display panel is provided with a display region and a non-display region, and includes a plurality of sub-pixels, located in the display region; a plurality of fingerprint recognition units, located in the display region; and ambient-light sensing units, including at least one first light-sensing unit. At least a part of the plurality of fingerprint recognition units is multiplexed as the at least one first light-sensing unit.

Another aspect of the present disclosure provides a display device. The display device includes a display panel, provided with a display region and a non-display region. The display panel includes a plurality of sub-pixels, located in the display region; a plurality of fingerprint recognition units, located in the display region; and ambient-light sensing units, including at least one first light-sensing unit. At least a part of the plurality of fingerprint recognition units is multiplexed as the at least one first light-sensing unit.

Another aspect of the present disclosure provides a control method for a display device. The display device includes a display panel, provided with a display region and a non-display region. The display panel includes a plurality of sub-pixels, located in the display region; a plurality of fingerprint recognition units, located in the display region; and ambient-light sensing units, including at least one first light-sensing unit. At least a part of the plurality of fingerprint recognition units is multiplexed as the at least one first light-sensing unit. The control method includes a plurality of driving periods, each driving period including a display stage and a fingerprint recognition stage. At least a part of the driving period further includes an ambient-light sensing stage. The display stage includes a front and rear corridor stage and a display scanning stage. In at least one driving period, the display scanning stage, the fingerprint recognition stage, and the ambient light-sensing stage are executed in a time-sharing manner, and the ambient-light sensing stage overlaps with the front and rear corridor stage.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Various exemplary embodiments of the present disclosure will now be described in detail with reference to the accompanying drawings. It should be noted that unless specifically stated otherwise, the relative arrangement of the components and steps, numerical expressions and numerical values set forth in the embodiments do not limit the scope of the present disclosure. The following description of the at least one exemplary embodiment is merely illustrative, and by no means can be considered as limitations for the application or use of the present disclosure. In addition, it should be noted that, for illustrative purposes, the drawings show, instead of all of the structure, only a part of the structure related to the present disclosure.

It should be noted that techniques, methods, and apparatuses known to those of ordinary skill in the relevant art may not be discussed in detail, but where appropriate, the techniques, methods, and apparatuses should be considered as part of the specification.

It should be noted that in all the examples provided and discussed herein, any specific value should be interpreted as merely exemplary and not as a limitation. Therefore, other examples of the exemplary embodiments may have different values.

It should be noted that similar reference numbers and letters indicate similar items in subsequent figures, and therefore, once an item is defined in a figure, it is not required to be further discussed or defined in the subsequent figures.

Figure 1:
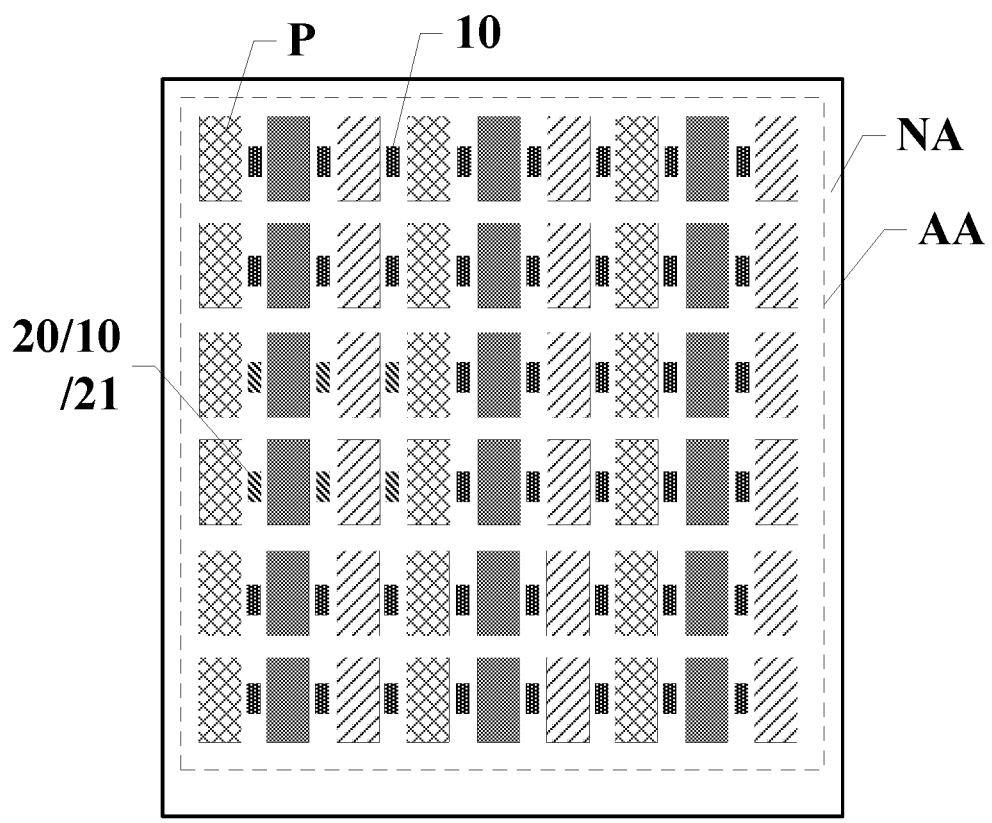
FIG. 1 illustrates a schematic top view of an exemplary display panel according to various embodiments of the present disclosure.

The present disclosure provides a display panel. FIG. 1 illustrates a schematic top view of an exemplary display panel according to various embodiments of the present disclosure. Referring to FIG. 1, the display panel 100 may be provided with a display region AA and a non-display region NA. The display panel 100 may include a plurality of sub-pixels P, disposed in the display region AA; a plurality of fingerprint recognition units 10, disposed in the display region AA; and ambient-light sensing units 20, including at least one first light-sensing unit 21. At least a part of the plurality of fingerprint recognition units 10 may be multiplexed as the first light-sensing units 21. That is, the plurality of fingerprint recognition units 10 may be partially multiplexed as the first light-sensing units 21.

It should be noted that FIG. 1 only uses a display panel 100 with a rectangular structure as an example to illustrate the disclosed display panel, and thus the display panel 100 does not limit the structure of the disclosed display panel. In other embodiments of the present disclosure, the structure of the display panel may have a non-rectangular structure with, for example, a rounded rectangular shape, a circular shape, etc. FIG. 1 only shows a plurality of sub-pixels P arranged in an array in the display region AA, and does not represent the actual number, size, and shape of the sub-pixels. In other embodiments, the sub-pixels P may be arranged in other appropriate means. In addition, FIG. 1 only shows fingerprint recognition units 10 arranged in the display region AA, and does not represent the actual number, size, shape, and arrangement of the fingerprint recognition units 10.

For example, referring to FIG. 1, in one embodiment, the display panel 100 may include a plurality of sub-pixels P and a plurality of fingerprint recognition units 10 disposed in the display region AA. The plurality of sub-pixels P may be used to implement picture display, and the plurality of fingerprint recognition units 10 may be used to collect fingerprint images and realize identity recognition. The fingerprint recognition units 10 may all be arranged in the display region AA, and may not occupy the space of the non-display region NA, thereby facilitating the realization of the narrow frame design of the display panel 100.

Further, referring to FIG. 1, the display panel 100 may also include a plurality of ambient-light sensing units 20. The plurality of ambient-light sensing units 20 may include at least one first light-sensing unit 21. The first light-sensing unit 21 may be used to sense the brightness of the ambient light, and the display brightness of the display panel may be adjusted adaptively according to the brightness of the ambient light, thereby conducive to improving the user experience.

For example, in one embodiment, at least a part of the plurality of fingerprint recognition units 10 may be used as the first light-sensing units 21. That is, introducing a new structure into the display panel 100 as the first light-sensing units 21 may be unnecessary, and the existing fingerprint recognition units 10 may be multiplexed as the first light-sensing units 21. As such, the fingerprint recognition units 10 may have both the fingerprint image acquisition function and the ambient-light sensing function. Therefore, while having both the fingerprint image acquisition function and the ambient-light sensing function, the display panel 100 may also be conducive to simplifying the product structure and simplifying the product manufacturing process. It should be noted that according to the present disclosure, when a part of the fingerprint recognition units 10 is multiplexed as the first light-sensing units 21, this part of the fingerprint recognition units 10 may perform a fingerprint image acquisition process and an ambient-light sensing process in a time-sharing manner. The fingerprint recognition function may be exerted in the fingerprint recognition stage, and the ambient-light sensing function may be exerted in the ambient-light sensing stage.

It should be understood that, in order to realize fingerprint recognition, the fingerprint recognition units 10 may be uniformly/evenly arranged in the entire display region AA, or may be distributed only in one or some areas of the display region AA, and the detailed arrangement of the fingerprint recognition units 10 is not specifically defined in the present disclosure. To realize the ambient-light sensing function, among the fingerprint recognition units, only a part of the fingerprint recognition units 10 may be multiplexed as the first light-sensing units 21. In the ambient-light sensing stage, only this part of the fingerprint recognition units 10 may be turned on for ambient-light sensing. As such, while realizing the ambient-light sensing function, the design may also be conducive to reducing the time spent for ambient-light sensing. It should be noted that, in order to realize the ambient-light sensing function, the fingerprint recognition units that are multiplexed as the first light-sensing units 21 may be the fingerprint recognition units 10 at any locations of the display region AA, and the detailed locations are not specifically defined in the present disclosure.

Figure 2:
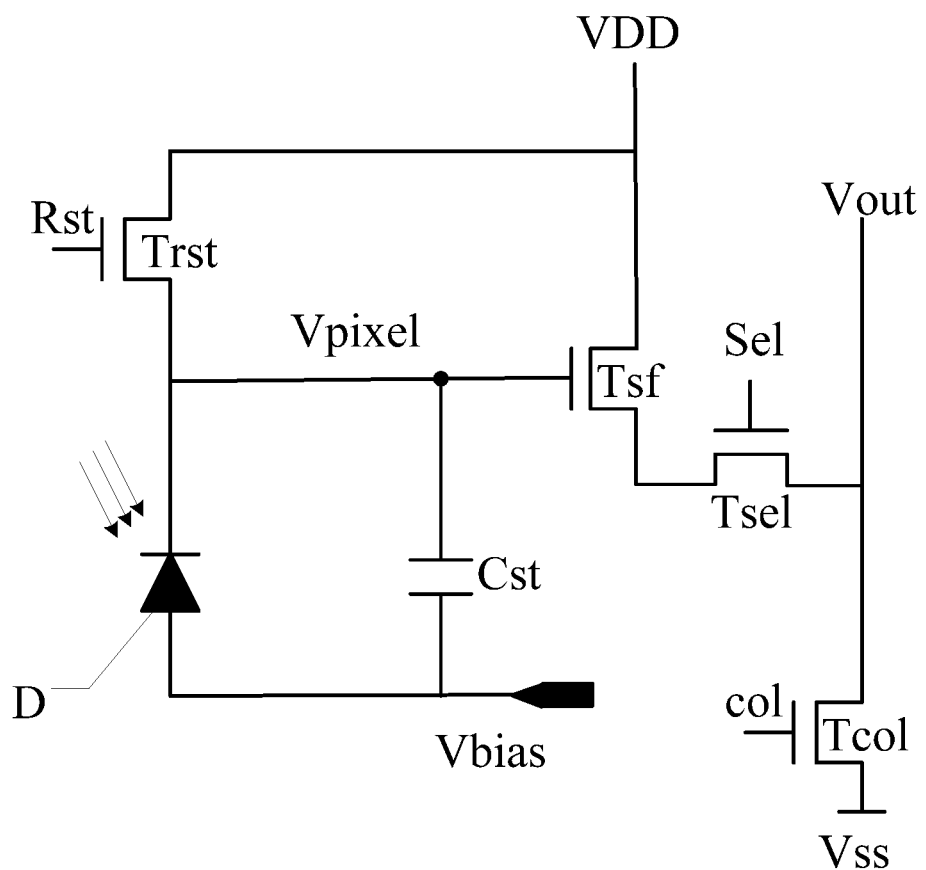
FIG. 2 illustrates a schematic diagram of a fingerprint recognition circuit corresponding to an exemplary fingerprint recognition unit according to various embodiments of the present disclosure.
Figure 3:
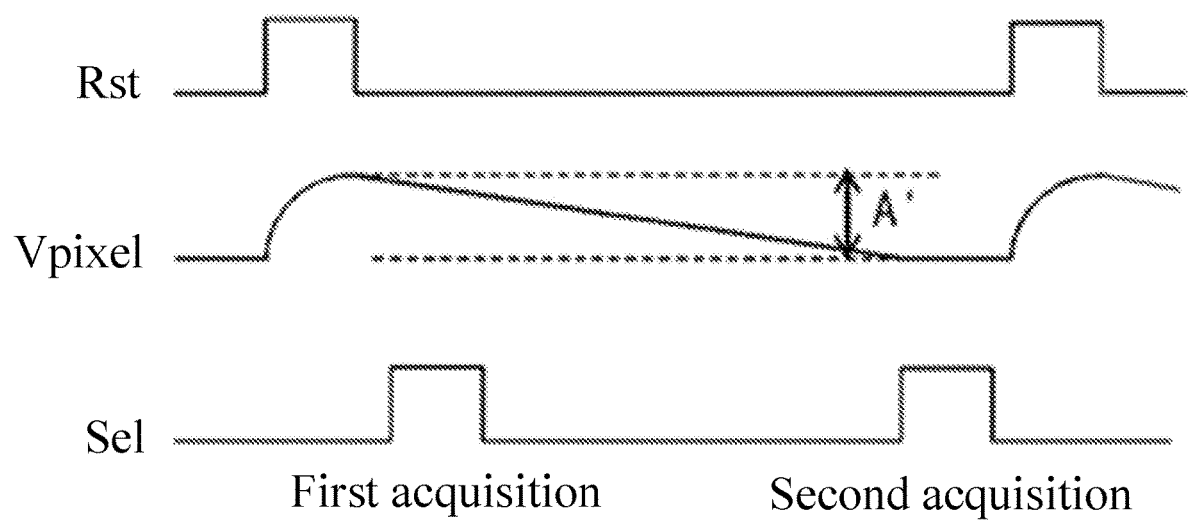
FIG. 3 illustrates a schematic signal timing diagram of the fingerprint recognition circuit shown in FIG. 2.

FIG. 2 illustrates a schematic diagram of a fingerprint recognition circuit corresponding to an exemplary fingerprint recognition unit according to various embodiments of the present disclosure, and FIG. 3 illustrates a schematic signal timing diagram of the fingerprint recognition circuit shown in FIG. 2. Referring to FIGS. 2-3, a fingerprint recognition circuit may include four switching transistor devices (e.g., transistor Trst, transistor Tsf, transistor Tsel, and transistor Tcol, respectively), a photosensitive diode D, and a first storage capacitor Cst. The fingerprint recognition circuit may also include five lead lines, e.g, a reset scan line Rst, a first voltage signal line VDD, a second voltage signal line VSS, a selection scan line Sel, and a voltage signal output line Vout. The transistor Tsel and the transistor Trst may need to be driven row by row by a shift register of the scan driving circuit. For fingerprint recognition circuit, when performing fingerprint recognition, the fingerprint recognition circuit may experience multiple stages including a reset stage, an exposure stage, and an electrical signal output stage, and details of each stage are described as follows.

In the reset stage, the transistor Trst may be turned on for conduction in response to a control signal of the reset scan line Rst to reset the fingerprint recognition circuit. A reset voltage signal of the first voltage signal line VDD may be transmitted to the gate of the transistor Tsf through the transistor Trst, and a voltage signal Vpixel of the gate of the transistor Tsf may rise to the input voltage value of the first voltage signal line VDD. At this time, the transistor Tsf may be turned on for conduction.

In the exposure stage, when a finger touches the screen, the light source may be reflected when hitting the valley lines and ridge lines of the fingerprint. Because the reflection angle and the reflected light intensity from the valley lines and the ridge lines are different, the light projected on the photosensitive diode D may cause the resistance of the photosensitive diode D to change, thereby generating charges, and forming a photocurrent. Due to leakage current, the voltage signal Vpixel of the gate of the transistor Tsf may begin to drop.

In the electrical signal output stage, because the reflection angle and the reflected light intensity from the valley lines and the ridge lines are different during the exposure stage, the generated photocurrent may be different, resulting in different changed values of the voltage signal Vpixel. As such, the fingerprint signals detected by the voltage signal output line Vout may also be different, and thus by detecting the voltage signal of the voltage signal output line Vout, the fingerprint recognition function may be realized.

The voltage signal Vpixel of the gate of the transistor Tsf may drop due to the influence of the photocurrent, the transistor Tsel may be turned on for conduction in response to the control signal for selecting scan line Sel, and the transistor Tcol may be turned on for conduction in response to the control signal for selecting the scan line col. The second voltage signal VSS may be written to the source of the transistor Tsf (the other end of the transistor Tsf opposite to the first voltage signal line VDD), and the reduced voltage signal Vpixel may still be able to turn on the transistor Tsf. The input voltage of the first voltage signal line VDD may be connected to the drain of the transistor Tsf. The transistor Tsf may be able to divide the output of the fingerprint voltage signal of the voltage signal output line Vout to realize the fingerprint recognition and detection function.

After the reset stage is over, the voltage signal Vpixel may be restored to the voltage of the voltage signal line VDD. At this time, the transistor Tsel may be turned on to perform a voltage-signal acquisition. The collected fingerprint output signal of the voltage signal output line Vout may be the initial signal. After a period for fingerprint recognition, because the ridges and the valleys of the fingerprint reflect light with different intensities, the voltage changed value A' of the voltage signal Vpixel may be different (as shown in FIG. 3). At this time, the transistor Tsel may be turned on for a second voltage-signal acquisition. The voltage signal output line Vout may be able to output different signals, and further, the fingerprint image may be obtained through signal processing.

It should be understood that FIGS. 2-3 only illustrate the fingerprint recognition circuit of one structure. In other embodiments, the fingerprint recognition units 10 may correspond to other circuit structures, which are not specifically defined in the present disclosure.

It should be noted that when the fingerprint recognition units are multiplexed as the first light-sensing units 21, the circuit structure corresponding to the first light-sensing units 21 may be the same as the circuit structure corresponding to the fingerprint recognition units 10. For example, the circuit structure corresponding to the first light-sensing units 21 may be the circuit structure shown in FIG. 2.

Figure 4:
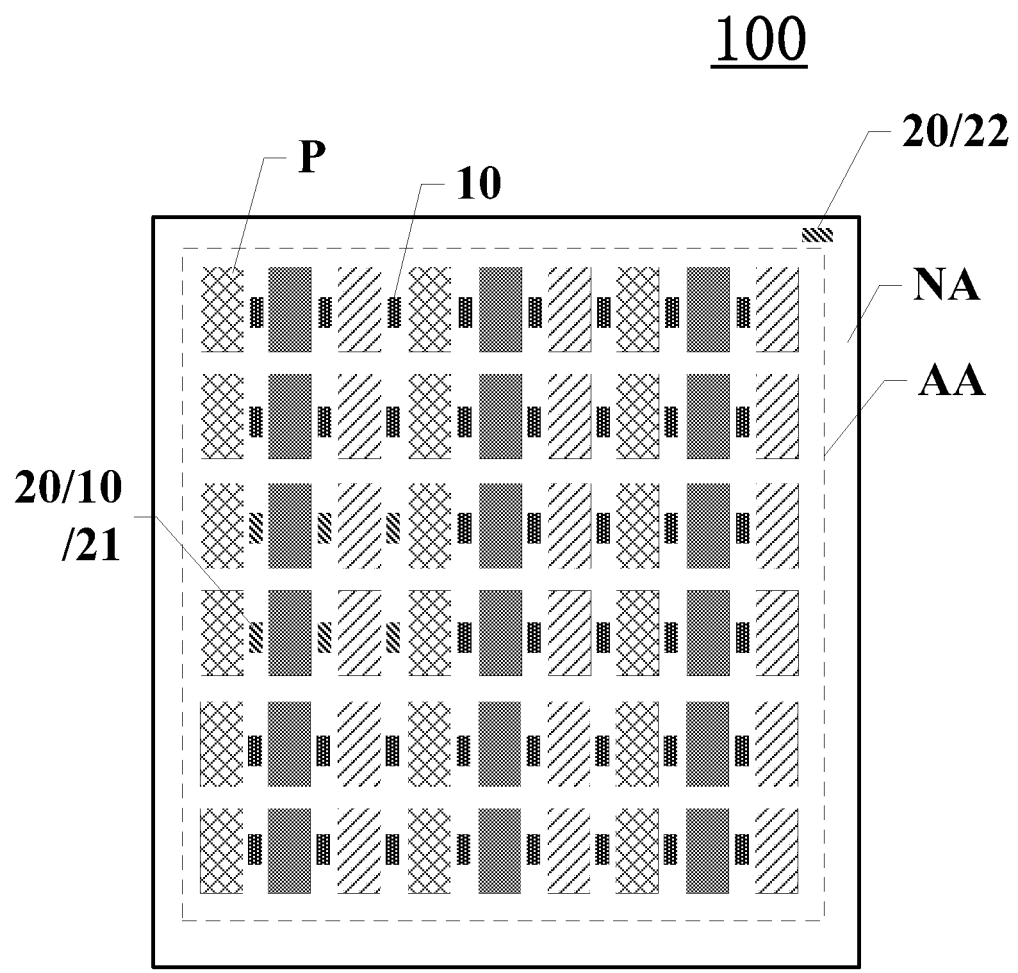
FIG. 4 illustrates a schematic top view of another exemplary display panel according to various embodiments of the present disclosure.

FIG. 4 illustrates a schematic top view of another exemplary display panel according to various embodiments of the present disclosure. Referring to FIG. 4, in the display panel 100, the ambient-light sensing units 20 may also include at least one second light-sensing unit 22. The first light-sensing unit 21 may include a first storage capacitor (for example, the storage capacitor Cst shown in FIG. 2), and the second light-sensing unit 22 may include a second storage capacitor. The capacitance value of the first storage capacitor may be smaller than the capacitance value of the second storage capacitor.

For example, in one embodiment, one or more second light-sensing units 22 may be introduced into the display panel 100. The circuit structure corresponding to the second light-sensing unit 22 may be the same as the circuit structure corresponding to the first light-sensing unit 21, and the only difference between the two light-sensing units (e.g., the first light-sensing unit 21 and the second light-sensing unit 22) may be different capacitance values for the storage capacitors in the two light-sensing units. In one embodiment, the storage capacitor corresponding to the first light-sensing unit 21 may be defined as a first storage capacitor and the storage capacitor corresponding to the second light-sensing unit 22 may be defined as a second storage capacitor. Further, the capacitance value of the second storage capacitor corresponding to the second light-sensing unit 22 may be greater than the capacitance value of the first storage capacitor corresponding to the first light-sensing unit 21.

It should be understood that corresponding to a larger capacitance value of the storage capacitor, the voltage change within a same integration time becomes smaller, and the light intensity that the light-sensing unit can withstand becomes higher. In one embodiment, the second storage capacitor with a larger capacitance may be introduced into the second light-sensing unit 22, so that the light intensity sensed by the second light-sensing unit 22 may be greater than the light intensity sensed by the first light-sensing unit 21. Therefore, the sensing requirements of the display panel 100 for different light intensities may be satisfied. When the ambient light is dark or in a normal indoor environment, the first light-sensing unit 21 may be used to perform ambient-light sensing without the need to activate the second light-sensing unit 22, thereby conducive to reducing the power consumption of the display panel 100; when the ambient light is strong, the second light-sensing unit 22 may be used to perform ambient-light sensing, and thus the display panel 100 may be able to meet the requirements for sensing ambient light with a high light intensity.

In one embodiment, the capacitance value of the first storage capacitor, denoted as C1, may satisfy $10 \text{ fF} \leq C1 \leq 50 \text{ fF}$; and the capacitance value of the second storage capacitor, denoted as C2, may satisfy $50 \text{ fF} < C2 \leq 300 \text{ fF}$.

It should be understood that, referring to FIG. 2 and FIG. 4, corresponding to a larger capacitance value of the storage capacitor, the region occupied on the display panel becomes larger. Since the first light-sensing units 21 multiplex the fingerprint recognition units 10 in the display region AA, in one embodiment, the capacitance value of the first storage capacitor may be set to be small. Setting the capacitance value of the first storage capacitor small may be conducive to reducing the space (e.g., area size) in the display region AA occupied by the first storage capacitor, and thus may avoid affecting the aperture ratio of the display panel 100.

When the capacitance value C1 of the first storage capacitor is set to be less than 10 fF, the light intensity that can be sensed by the first storage capacitor may be small, which is not conducive to realizing the sensing of ambient light with different light intensity. Moreover, when the capacitance value C1 of the first storage capacitor is less than 10 fF, the anti-noise ability of the fingerprint recognition unit may be weakened in the fingerprint recognition stage. Therefore, light that is not reflected by the touching object may also be processed as light reflected by the touching object, which may significantly reduce the accuracy of fingerprint recognition and affect the normal implementation of the fingerprint recognition function. However, when the capacitance value C1 of the first storage capacitor is set to be greater than 50 fF, the space (e.g., area size) in the display region AA occupied by the first storage capacitor may be large, thereby affecting the aperture ratio of the display panel 100. Therefore, in one embodiment, the capacitance value C1 of the first storage capacitor may be set to $10\ \mathrm{fF} \leq C1 \leq 50\ \mathrm{fF}$, so that the first light-sensing unit 21 may be able to sense ambient light in a large illumination range. In the meantime, setting the capacitance value C1 of the first storage capacitor in the range may be conducive to improving the anti-noise ability of the fingerprint recognition unit, and thus improving the accuracy of fingerprint recognition. Also, setting the capacitance value C1 of the first storage capacitor in the range may also be conducive to saving the space (e.g, area size) in the display region AA occupied by the first storage capacitor to ensure the pixel aperture ratio of the display panel 100. It should be noted that when the capacitance value C1 of the first storage capacitor is set to $10\ \mathrm{fF} \leq C1 \leq 50\ \mathrm{fF}$, the first light-sensing unit 21 may be able to sense the light in the daily indoor environment.

When the capacitance value C2 of the second storage capacitor is set to be less than or equal to 50 fF, the light intensity that can be sensed by the second light-sensing unit 22 may partially overlap with the light intensity that can be sensed by the first light-sensing unit 21, which may cause waste of resources. When the capacitance value of the second storage capacitor is set to be greater than 300 fF, on the one hand, the space on the display panel 100 occupied by the second storage capacitor may be too large; and on the other hand, the range of light intensity that can be sensed by the second storage capacitor may far exceed the range of light intensity in the actual application of the user, which may also cause waste of resources. Therefore, in one embodiment, the capacitance value C2 of the second storage capacitor may be set to $50\ \mathrm{fF} < C2 \leq 300\ \mathrm{fF}$, which may not only help to save the space on the display panel 100 occupied by the second storage capacitor and satisfy the ambient-light sensing requirements with high light intensity, but also avoid waste of resources and save production costs. It should be noted that when the capacitance value C2 of the second storage capacitor is set as $50\ \mathrm{fF} < C2 \leq 300\ \mathrm{fF}$, the second light-sensing unit 22 may be able to sense outdoor ambient light with strong sunlight in a sunny environment.

Figure 5:
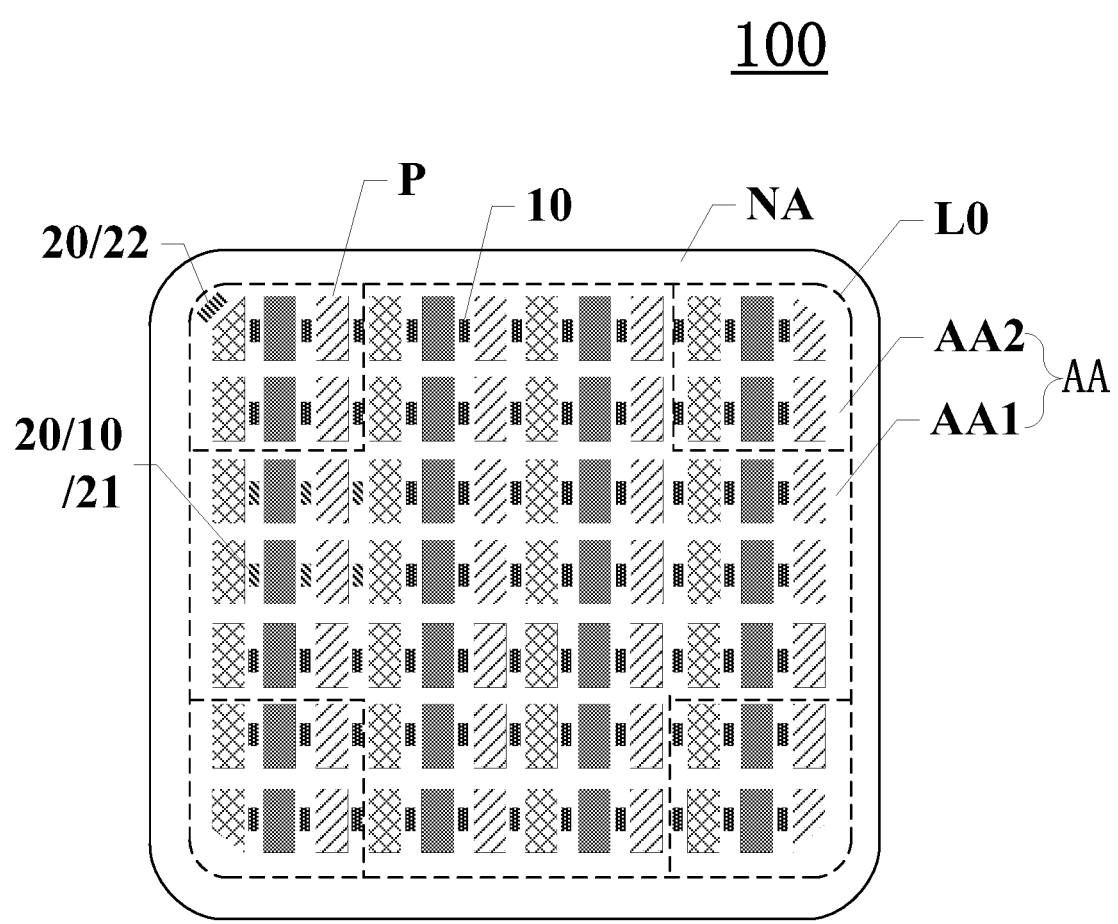
FIG. 5 illustrates a schematic top view of another exemplary display panel according to various embodiments of the present disclosure.

FIG. 5 illustrates a schematic top view of another exemplary display panel according to various embodiments of the present disclosure. Referring to FIG. 5, in one embodiment, the display region AA may include a first display region AA1 and a second display region AA2. The pixel aperture ratio of the first display region AA1 may be greater than the pixel aperture of the second display region AA2. The second light-sensing unit 22 may be located in the second display region AA2.

For example, FIG. 5 shows a structure of a display panel 100 when the display panel 100 has an irregular shape. The display region AA of the display panel 100 may include a first display region AA1 with a larger pixel aperture ratio and a second display region AA2 with a smaller pixel aperture ratio. When the pixel aperture ratio in the second display region AA2 is small, in a unit area, the corresponding non-pixel aperture region in the second display region AA2 may be large. As such, the second light-sensing unit 22 may not occupy the space of the first display region AA1. Therefore, even when the second light-sensing unit 22 is introduced into the display panel 100, the introducing of the second light-sensing unit 22 may not affect the pixel aperture ratio of the first display region AA1, and thus may not affect the overall display effect of the display panel 100. It should be noted that various embodiments of the present disclosure only illustrate a part of the sub-pixels, and the embodiments do not represent the actual pixel arrangement form and arrangement density in the first display region AA1 and the second display region AA2.

Figure 6:
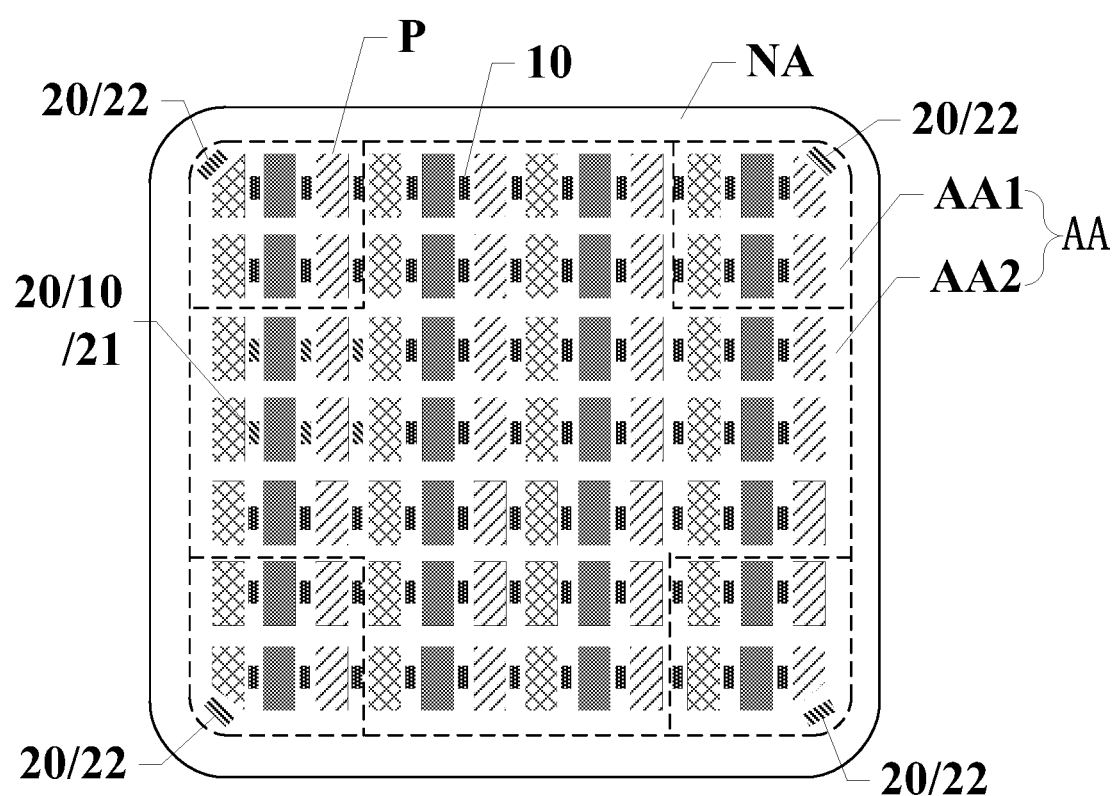
FIG. 6 illustrates a schematic top view of another exemplary display panel according to various embodiments of the present disclosure.

In one embodiment, referring to FIG. 5, the second display region AA2 may include an arc-shaped edge LO. In the embodiment illustrated in FIG. 5, a rounded rectangular display panel 100 is taken as an example for description. At the same time, the display region AA may also include four rounded corner regions, and the display region AA corresponding to the four rounded corner regions may be the second display region AA2. Therefore, the second display region AA2 may include an arc-shaped edge LO. In one embodiment, the second light-sensing units 22 may be arranged in the rounded corner regions to avoid introducing the second light-sensing units 22 in the first display region AA1 and thus affecting the pixel aperture ratio of the first display region AA1. It should be noted that FIG. 5 only shows a situation where the second light-sensing units 22 are provided in the rounded corner regions, and only one second light-sensing unit 22 is provided as an example for illustration. In other embodiments, the number of second light-sensing units provided in the rounded corner regions may be two or more. Moreover, the second light-sensing units 22 may be respectively arranged in different rounded corner regions. FIG. 6 illustrates a schematic top view of another exemplary display panel according to various embodiments of the present disclosure. Referring to FIG. 6, a situation where the second light-sensing units 22 are respectively provided in the four rounded corner regions. In this case, a plurality of second light-sensing units 22 may simultaneously sense the ambient light. When adjusting the brightness of the display panel 100 according to the ambient light signals sensed by the plurality of second light-sensing units 22, the adjustment accuracy may be high, which may be more conducive to improving the user's visual experience.

In one embodiment, referring to FIG. 4, the second light sensing unit 22 may be located in the non-display region NA.

For example, FIG. 4 shows a situation in which the second light-sensing unit 22 is disposed in the non-display region NA of the display panel 100. When the second light-sensing unit 22 is disposed in the non-display region NA of the display panel 100, the second light-sensing unit 22 may be prevented from occupying the space of the display region AA, thereby conducive to increasing the overall pixel aperture ratio of the display panel 100.

Figure 7:
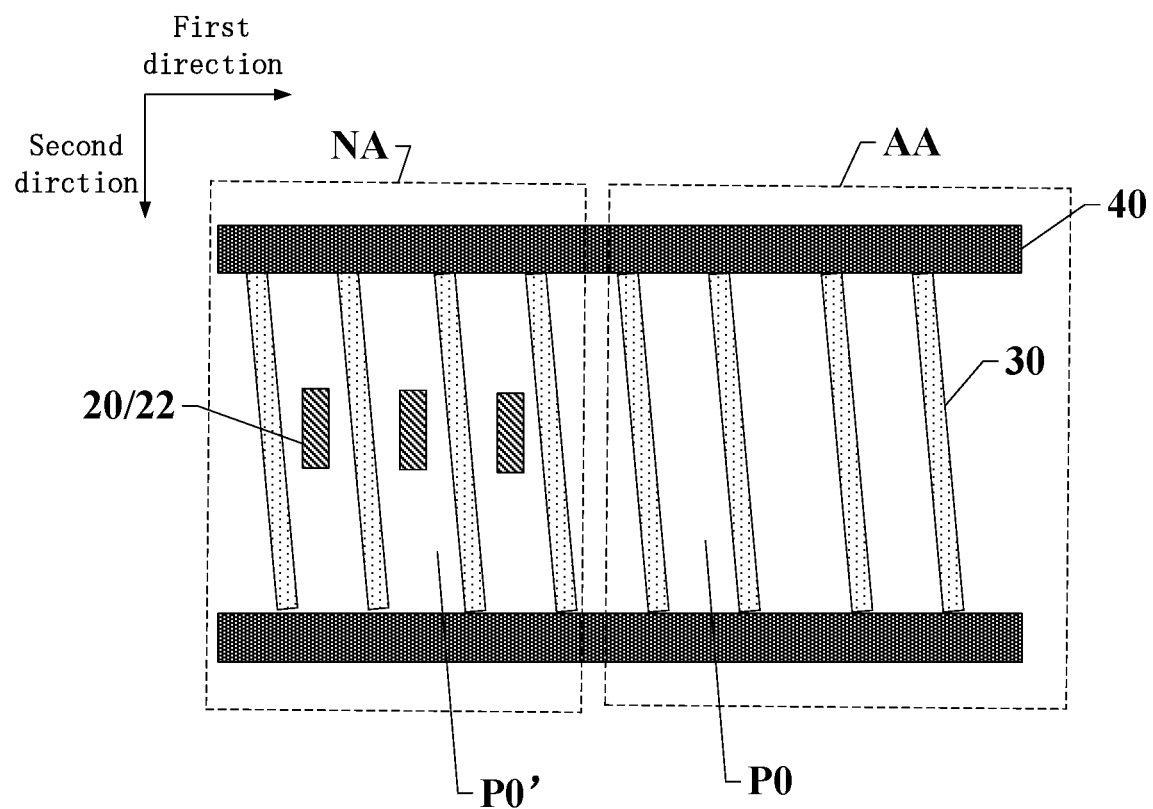
FIG. 7 illustrates a schematic diagram of pixel-unit rows in an exemplary display panel according to various embodiments of the present disclosure.

In one embodiment, when the second light-sensing unit 22 is disposed in the non-display region NA of the display panel 100, the second light-sensing unit 22 may be disposed in a dummy pixel region. FIG. 7 illustrates a schematic diagram of pixel-unit rows in an exemplary display panel according to various embodiments of the present disclosure. Referring to FIG. 7, when fabricating sub-pixels on the display panel 100, a plurality of data lines 30 and a plurality of scan lines 40 staggered horizontally and vertically may usually be formed on the display panel 100 through an etching process or any other appropriate process. The region defined by the intersection of two adjacent data lines 30 and two adjacent scan lines 40 may be a sub-pixel region P0. The sub-pixel region P0 in the display region AA may be used to implement the display function. To ensure the load uniformity of the display panel 100, a plurality of sub-pixel regions P0' may also be formed in the non-display region NA of the display panel 100. This part of region is not used for display and thus may be called a dummy pixel region P0'. When the second light-sensing unit 22 is introduced into the display panel 100, the second light-sensing unit may be arranged in the above-mentioned dummy pixel region P0', so that the display panel 100 may not only realize high-intensity light sensing, but also effectively utilize the space of the display panel 100 to avoid affecting the pixel aperture ratio of the display panel 100.

Figure 8:
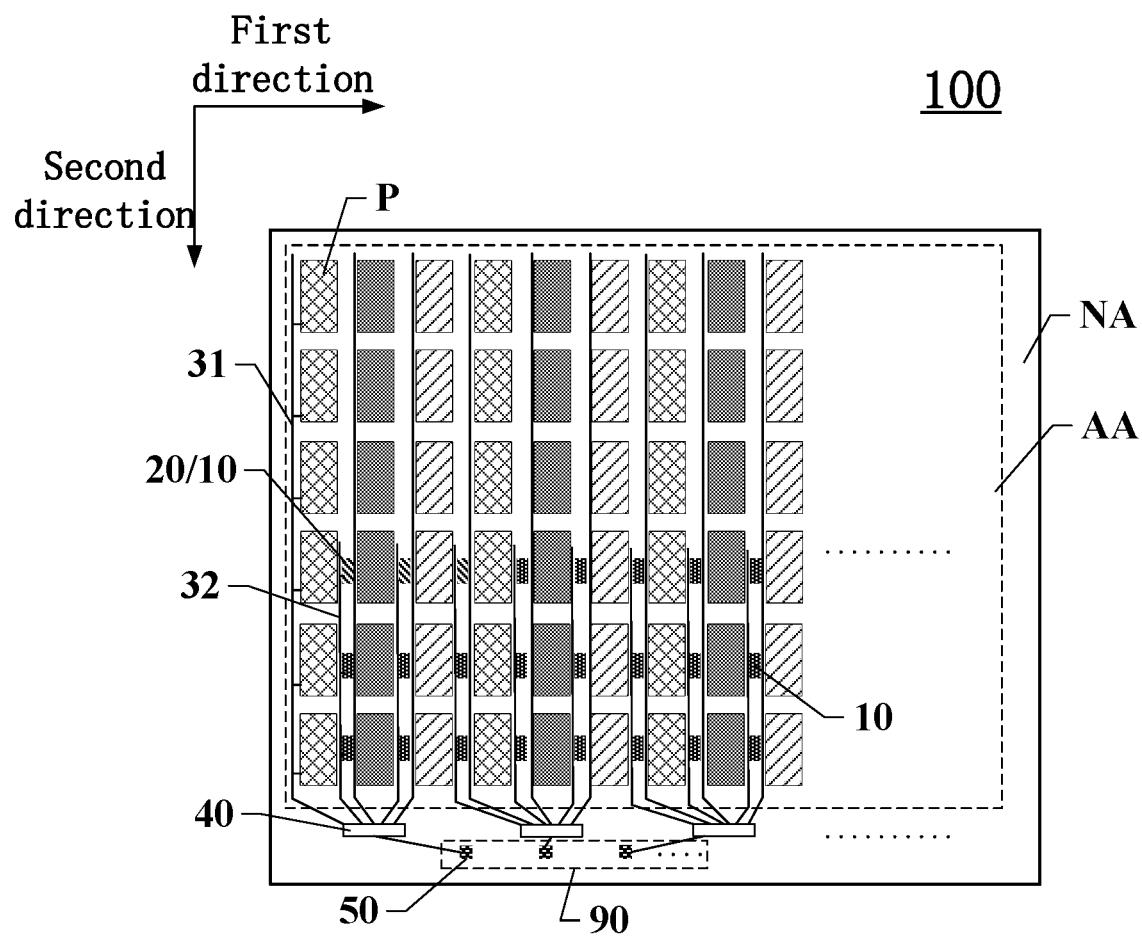
FIG. 8 illustrates a schematic top view of another exemplary display panel according to various embodiments of the present disclosure.

FIG. 8 illustrates a schematic top view of another exemplary display panel according to various embodiments of the present disclosure. Referring to FIG. 8, in one embodiment, the non-display region NA of the display panel 100 may include a bonding region 90, and the bonding region 90 may further include a plurality of conductive pads 50.

The display region AA may include a plurality of first data lines 31 arranged in a first direction and extending in a second direction. A same first data line 31 may be electrically connected to a plurality of sub-pixels P located in different rows. The first direction and the second direction may intersect each other. It should be noted that FIG. 8 only shows the connection relationship between a part of the sub-pixels P and the first data line 31.

The display region AA may include a plurality of second data lines 32 arranged in the first direction and extending in the second direction, and the fingerprint recognition units 10 may include a fingerprint recognition sensor (now shown). A same second data line 32 may be electrically connected to a plurality of fingerprint recognition sensors located in different rows. It should be noted that FIG. 8 only shows the connection relationship between a part of the fingerprint recognition units 10 and the second date line 32.

The display panel 100 may further include a plurality of switch circuits 40, and at least one of the first data lines 31 and at least one of the second data lines 32 may be connected to a same conductive pad 50 through a switch circuit 40.

For example, referring to FIG. 8, in the display panel 100 according to various embodiments of the present disclosure, a plurality of conductive pads 50 may be provided in the bonding region 90 of the non-display region NA. The bonding region 90 may be used to bind a driving chip or a flexible circuit board, and the first data lines 31 connected to the sub-pixels P and the second data lines 32 connected to the fingerprint recognition sensors may be electrically connected to the conductive pads for electric signal transmission. Moreover, a plurality of switch circuits 40 may also be provided in the display panel 100. At least one first data line 31 and at least one second data line 32 may be electrically connected to a same conductive pad 50 through the switch circuit 40. When an electrical signal needs to be transmitted to the sub-pixels P, the switch circuit 40 may electrically connect the first data line 31 with the conductive pad 50. When an electrical signal needs to be transmitted to the fingerprint recognition sensors, the switch circuit 40 may electrically connect the second data line 32 with the conductive pad 50. That is, when the fingerprint recognition units 10 are provided in the display panel 100, the second data line 32 in the fingerprint recognition units 10 and the first data line 31 in the display panel 100 may share a conductive pad 50, and thus introducing new conductive pads as the fingerprint recognition units 10 may be unnecessary. Therefore, the disclosed display panel 100 may be conducive to reducing the number of conductive pads in the bonding region 90. That is, changing the design of the conductive pads 50 in the bonding region of the display panel 100 may be unnecessary, which may be conducive to simplifying the manufacturing process of the bonding region of the display panel 100 after the fingerprint recognition units 10 are introduced.

Figure 9:
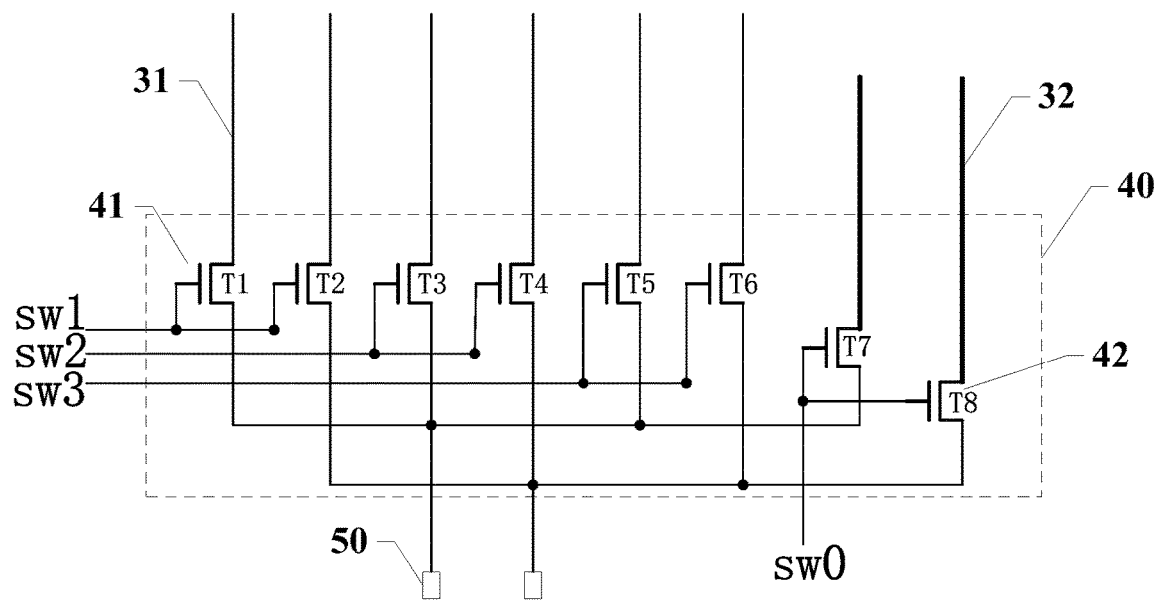
FIG. 9 illustrates a schematic circuit diagram of connections from first data lines and second data lines to a switch circuit.

FIG. 9 illustrates a schematic circuit diagram of connections from first data lines and second data lines to a switch circuit. Specifically, the circuit diagram shows the detailed structure of a switch circuit 40, and takes the connection relationship between six first data lines 31 corresponding to two pixel units and two second data lines 32 corresponding to two fingerprint recognition units 10 as an example for illustration.

Referring to FIG. 9, in one embodiment, the switch circuit 40 may include a plurality of switch groups, and each switch group may include at least one first switch and at least one second switch. The first terminals of the first switches may be electrically connected to the first data lines 31 in a one-to-one correspondence. The first terminals of the second switches may be electrically connected to the second data lines 32 in a one-to-one correspondence.

In a same switch group, the second terminals of the first switches and the second terminals of the second switches may be connected to a same conductive pad 50. The first switches and the second switches in a same switch group may be turned on for conduction in a time-sharing manner.

For example, referring to FIG. 9, the switch circuit 40 may include two switch groups. One switch group of the two switch groups may include three first switches, e.g., T1, T3, and T5, and a second switch T7. The other switch group may include three first switches, e.g., T2, T4, and T6, and a second switch T8. It should be noted that FIG. 9 only illustrates an example for the number of first switches and the number of second switches included in each switch group, and in other embodiments, the number of first switches and the number of second switches included in each switch group may be adjusted according to the actual needs, which are not specifically defined in the present disclosure.

Further, referring to FIG. 9, the first data lines 31 may be electrically connected to the first terminals of the first switches (T1-T6) of each switch group in a one-to-one correspondence manner, and the second data lines 32 may be electrically connected to the first terminals of the second switches (T7-T8) of each switch group in a one-to-one correspondence manner. The second terminal of each first switch and the second terminal of each second switch in the same switch group may be connected to a same conductive pad 50. In the display stage, the first switches connected to the first data lines 31 in a same switch group may be controlled to be turned on for conduction in a time-sharing manner, and the second switches connected to the second data lines 32 may be controlled to be turned off. As such, the conductive pad 50 may transmit data signals to the first data lines 31 corresponding to the turned-on first switches. In the fingerprint recognition stage or the ambient-light sensing stage, the second switches connected to the second data lines 32 in a same switch group may be controlled to be turned on for conduction, and the first switches connected to the first data lines 31 may be controlled to be turned off, so that the conductive pad 50 may be electrically connected to the second data lines 32, and the signal of the fingerprint recognition unit 10 may be transmitted to the conductive pad 50. As such, multiplexing a same conductive pad 50 for the display stage and the fingerprint recognition stage or the ambient-light sensing stage in a time-sharing manner may be realized. Even when the fingerprint recognition units 10 are introduced into the display panel 100, the number of the conductive pads 50 can be effectively controlled (e.g., the number of the conductive pads 50 may not be excessively large).

In one embodiment, the first switch and/or the second switch may include transistors. Each transistor may be a P-type transistor or an N-type transistor according to the actual needs, and the type of the transistor used in the first switch and/or the second switch is not specifically defined in the present disclosure.

In one embodiment, referring to FIG. 9, each switch group may include a plurality of first switches, and the plurality of first switches in the same switch group may be turned on for conduction in a time-sharing manner.

For example, FIG. 9 shows a situation where three first switches are included in each switch group. The first terminals of the three first switches may respectively correspond to the first data lines 31, which correspond to sub-pixels of different colors. For example, first terminals of the three first switches may correspond to the first data lines connected to red sub-pixels, green sub-pixels, and blue sub-pixels, respectively. The control terminals of the three switches in the same switch group may be connected to different control signal terminals sw1, sw2, and sw3. In a time-sharing manner, the control switches connected to the control signal terminals (e.g., sw1, sw2, and sw3) may be respectively controlled to be turned on for conduction. In the display stage, the same conductive pad 50 may transmit data signals to the red sub-pixel P, the green sub-pixel P, and the blue sub-pixel P in a time-sharing manner. Therefore, there is no need to provide a conductive pad 50 for each of the first data lines 31 corresponding to different sub-pixels P, and the plurality of first data lines 31 may multiplex the same conductive pad 50 in a time-sharing manner. As such, the number of the conductive pads 50 included in the display panel 100 may be further reduced, which may be conducive to simplifying the design of the control chip or the flexible circuit board bound to the bonding region. In one embodiment, the control terminals of the second switches T7 and T8 in the two switch groups may be connected to a same control signal terminal sw0, and the control signal terminal sw0 may control the second switches T7 and T8 to be turned on simultaneously for fingerprint image acquisition or ambient-light sensing.

Figure 10:
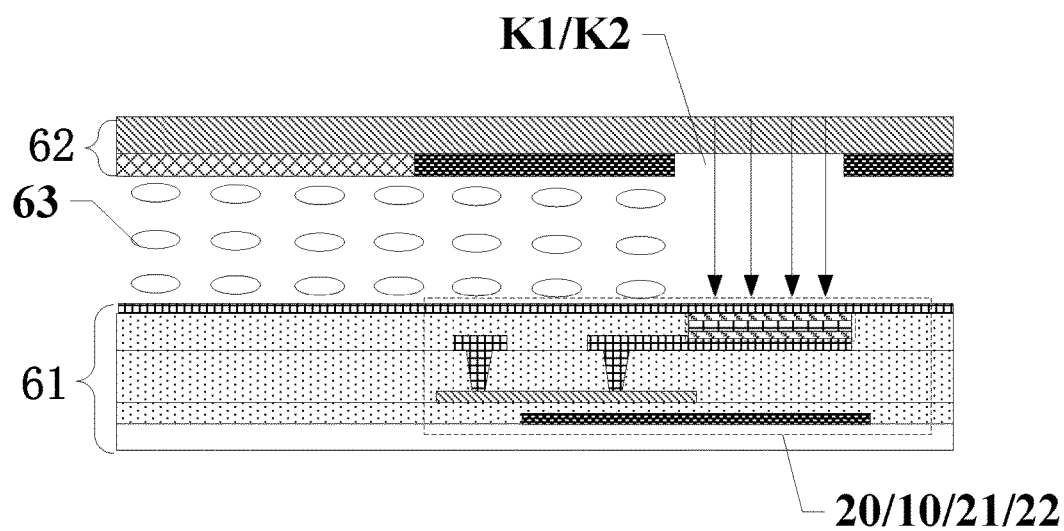
FIG. 10 illustrates a schematic structural diagram of an exemplary display panel according to various embodiments of the present disclosure.

FIG. 10 illustrates a schematic structural diagram of an exemplary display panel according to various embodiments of the present disclosure. A liquid crystal display (LCD) panel is provided as an example in FIG. 10 to illustrate the disclosed display panel.

Referring to FIG. 10, the display panel 100 may also include an array substrate 61, a color filter substrate 62 arranged opposite to the array substrate 61, and liquid crystals 63 filled between the array substrate 61 and the color filter substrate 62. The fingerprint recognition units may be integrated in the array substrate 61. The color filter substrate 62 may include a plurality of fingerprint recognition openings K1. In a direction perpendicular to the light-emitting surface of the display panel 100, the fingerprint recognition units 10 may overlap with the fingerprint recognition openings K1.

In one embodiment, when the display panel 100 is an LCD panel, the fingerprint recognition units 10 may be integrated in the array substrate 61. In addition to a plurality of pixel openings, the color filter substrate 62 may also be provided with a plurality of fingerprint recognition openings K1. The fingerprint recognition opening K1 may expose at least a part of a corresponding fingerprint recognition unit 10. For example, the fingerprint recognition opening K1 may expose the fingerprint recognition sensor in the fingerprint recognition unit 10, such that in the fingerprint recognition stage, the light reflected by the touching object may be able to pass through the fingerprint recognition opening K1 to the fingerprint recognition sensor; and in the ambient-light sensing stage, external ambient light may be irradiated to the fingerprint recognition sensor through the fingerprint recognition opening K1. In one embodiment, a black matrix layer may be provided on the color filter substrate 62, and both the plurality of pixel openings and the plurality of fingerprint recognition openings K1 may be obtained by forming openings in the black matrix layer.

In other embodiments, when the disclosed display panel is an LCD panel, the second light-sensing units 22 may be integrated in the array substrate 61, and the color filter substrate 62 may include at least one light-sensing opening K2. In the direction perpendicular to the light-emitting surface of the display panel 100, each second light-sensing unit 22 may overlap with a corresponding light-sensing opening K2.

For example, referring to FIG. 10, the structure of the second light-sensing unit 22 may be referred to the structure of the fingerprint recognition unit 10, and the structure of the light-sensing opening K2 corresponding to the second light-sensing unit 22 may be referred to the structure of the fingerprint recognition opening K1. The differences between the second light-sensing unit 22 and the first light-sensing unit 21 may only include the following aspects. The second storage capacitor in the second light-sensing unit 22 may be larger than the first storage capacitor in the first light-sensing unit 21. The second light-sensing unit 22 may be arranged in a region with a smaller gray scale in the display panel 100, for example, in the non-display region NA, or arranged in a region with a smaller pixel aperture ratio in the display region AA. According to the disclosed display panel, a plurality of second light-sensing unit 22 is integrated in the array substrate 61, and a plurality of light-sensing opening K2 is disposed on the color filter substrate 62. In the ambient-light sensing stage, the external ambient light may be irradiated to the second light-sensing unit 22 through the second light-sensing opening K2. Moreover, the disclosed display panel 100 integrates the fingerprint recognition units 10 on the array substrate 61 without adding a new layer into the display panel 100 for the fingerprint recognition units 10, which is conducive to reducing the thickness of the film layers after introducing the fingerprint recognition units 10 into the display panel 10, and thus conducive to realizing a thin design for the display panel 100.

Figure 11:
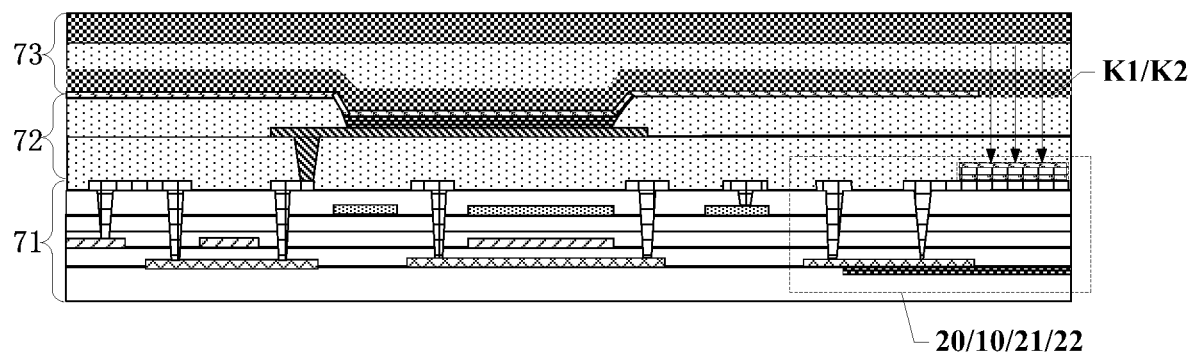
FIG. 11 illustrates a schematic structural diagram of another exemplary display panel according to various embodiments of the present disclosure.

The disclosed display panel 100 may be suitable not only for LCD panels, but also for other display panels such as organic light-emitting diode (OLED) display panels. FIG. 11 illustrates a schematic structural diagram of another exemplary display panel according to various embodiments of the present disclosure. An OLED display panel is provided as an example in FIG. 11 to illustrate the disclosed display panel.

Referring to FIG. 11, in one embodiment, the disclosed display panel 100 may also include a driving circuit layer 71, a light-emitting element layer 72, and an encapsulation layer 73. The driving circuit layer 71, the light-emitting element layer 72, and the encapsulation layer 73 may form a stack structure with the light-emitting element layer 72 disposed between the driving circuit layer 71 and the encapsulation layer 73. The fingerprint recognition units 10 may be integrated in the driving circuit layer 71. The light-emitting element layer 72 may include a plurality of fingerprint recognition openings K1. In the direction perpendicular to the light-emitting surface of the display panel 100, each fingerprint recognition unit 10 may overlap with a corresponding fingerprint recognition opening K1.

For example, FIG. 11 illustrates an example where a plurality of fingerprint recognition units 10 is integrated in an OLED display panel. The plurality of fingerprint recognition units 10 may be integrated in the driving circuit layer 71. In the direction of each fingerprint recognition unit 10 facing the light-emitting surface of the display panel 100, a fingerprint recognition opening K1 may be provided. In the fingerprint recognition stage or the ambient-light sensing stage, light can be transmitted to the fingerprint recognition unit 10 through the corresponding recognition opening K1. The disclosed display panel 10, the plurality of fingerprint recognition units 10 is integrated in the driving circuit layer 71. Thus, introducing a new layer into the display panel 100 for the fingerprint recognition units 10 becomes unnecessary, and thus the disclosed display panel 100 is conducive to reducing the thickness of the film layers after introducing the fingerprint recognition units 10 into the display panel 10, and thus conducive to realizing a thin design for the display panel 100.

It should be understood that the principle of the disclosed display panel can also be applied to Mini-LED display panels or Micro-LED display panels, and the fingerprint recognition units can be arranged in the driving circuit layer. As such, while realizing the fingerprint recognition function and the ambient-light sensing function, the display panels may also be conducive to reducing the thickness of the film layers after introducing the fingerprint recognition units into the display panel, and thus conducive to realizing a thin design for the display panel.

Figure 12:
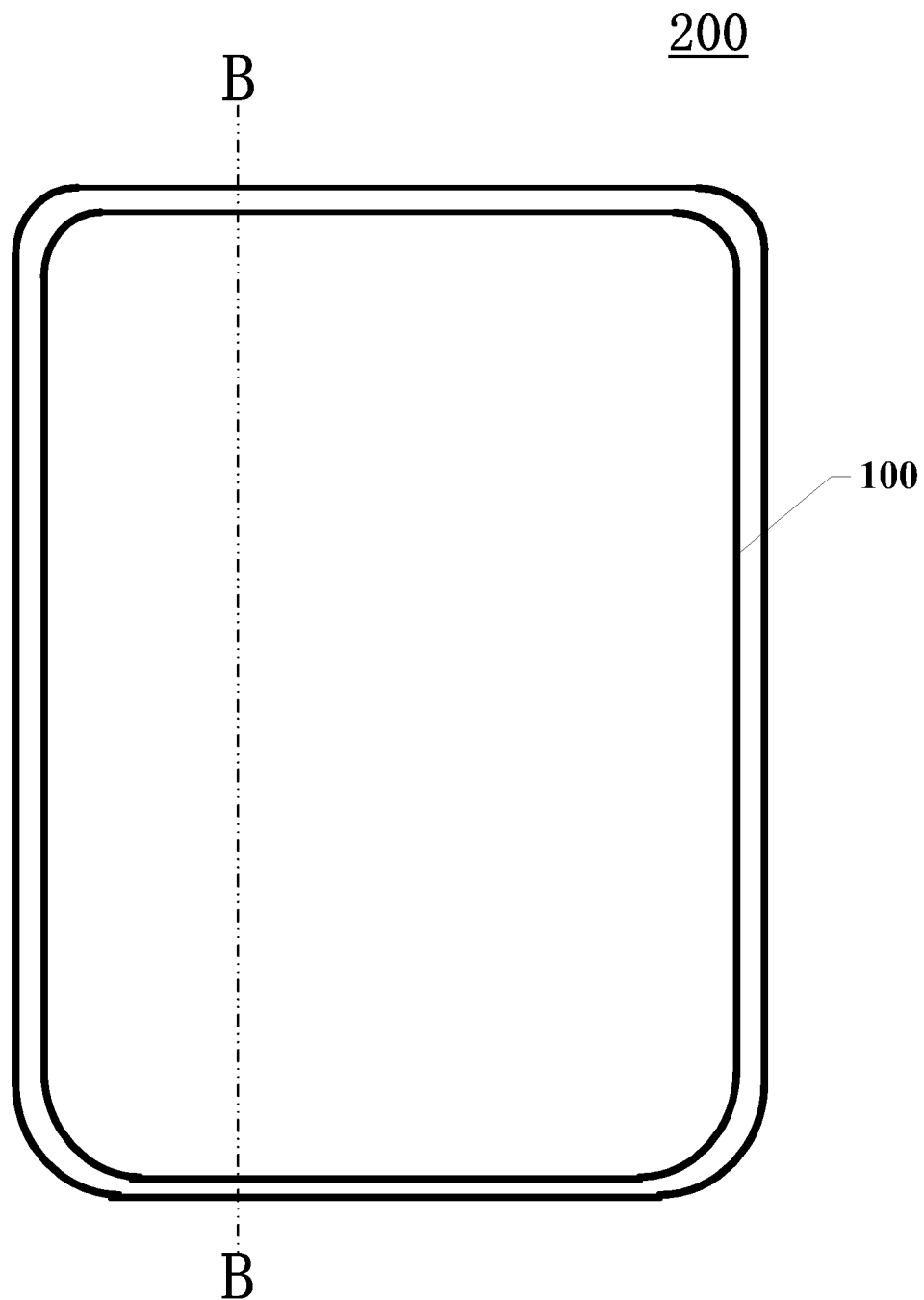
FIG. 12 illustrates a schematic top view of an exemplary display device according to various embodiments of the present disclosure.

Based on the same principle, the present disclosure also provides a display device. FIG. 12 illustrates a schematic top view of an exemplary display device according to various embodiments of the present disclosure. Referring to FIG. 12, the display device 200 may include a display panel according to various embodiments of the present disclosure. In the display device 200, at least a part of the plurality of fingerprint recognition units 10 may be multiplexed as a plurality of first light-sensing units. That is, introducing a new structure into the display panel 100 as the first light-sensing units may be unnecessary, and the existing fingerprint recognition units can be multiplexed as the first light-sensing units, so that the fingerprint recognition units may have both the fingerprint image acquisition function and the ambient-light sensing function. Therefore, while having the fingerprint recognition function and the ambient-light sensing function, the disclosed display panel may also be conducive to simplifying the product structure and simplifying the product manufacturing process.

It should be noted that, for the embodiments of the disclosed display device 200, reference may be made to the embodiments of the disclosed display panel 100 provided above, and the details are not described here again. The display device according various embodiments of the present disclosure may include any product or component with display functions, such as mobile phones, tablet computers, televisions, monitors, laptop computers, digital photo frames, navigators, etc.

Figure 13:
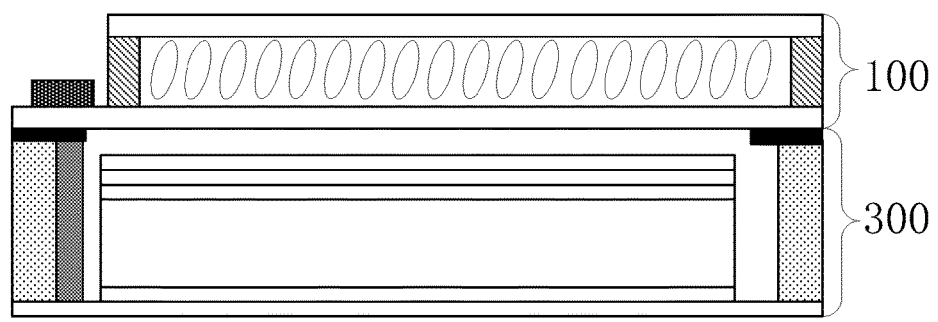
FIG. 13 illustrates a schematic cross-sectional view of the display device shown in FIG. 12 along a B-B direction.

The display device according to various embodiments of the present disclosure may be an LCD device, an OLED display device, a Mini-LED display device, or a Micro-LED display device, etc. In one embodiment, the disclosed display device is an LCD device, the cross-sectional view of the display device may refer to FIG. 13, which illustrates a schematic cross-sectional view of the display device shown in FIG. 12 along a BB direction. Referring to FIG. 13, the display device 200 may include a display panel 100 and a backlight module 300. The display panel 100 may be located on the light-emitting surface of the backlight module 300. When the disclosed display device is an OLED display device, a Mini-LED display device, or a Micro-LED display device, the structure of the display device may refer to the structures in existing technology, and the details are not described here.

Figure 14:
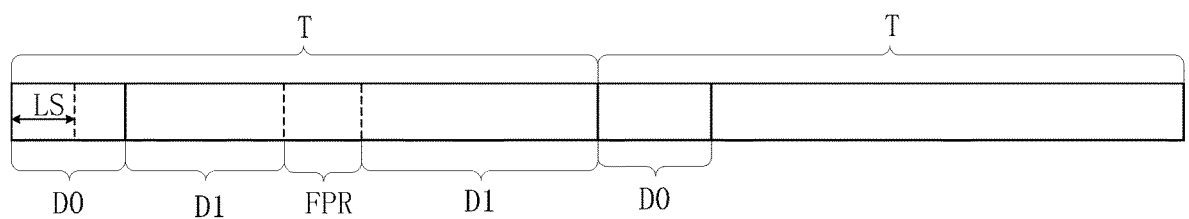
FIG. 14 illustrates a schematic diagram of two driving periods in an exemplary control method for a display device according to various embodiments of the present disclosure.

Based on the same principle, the present disclosure also provides a control method for the display device. The control method may be applied to a display device according to various embodiments of the present disclosure. FIG. 14 illustrates a schematic diagram of two driving periods T in an exemplary control method for a display device according to various embodiments of the present disclosure. Referring to FIG. 14, the control method may include a plurality of driving periods T, and each driving period T may include a display stage (D0 and D1) and a fingerprint recognition stage FPR. At least a part of the driving period T may further include an ambient-light sensing stage LS. The display stage may include a front and rear corridor stage D0 and a display scanning stage D1.

In at least one driving period T, the display scanning stage D1, the fingerprint recognition stage FPR, and the ambient-light sensing stage LS may be executed in a time-sharing manner, and the ambient-light sensing stage LS may overlap with the front and rear corridor stage D0.

For example, according to the disclosed driving method of the display device, the display stage may include a front and rear corridor stage D0 and a display scanning stage D1. The front and rear corridor stage D0 may be the corresponding pre-charging stage in each driving period, during which the sub-pixels in the display panel may not be scanned; the display scanning stage D1 may be the time period during which the sub-pixels in the display panel may be actually scanned. According to the present disclosure, the display scanning stage D1, the fingerprint recognition stage FPR, and the ambient-light sensing stage LS may be executed in a time-sharing manner without interfering with each other. For example, after the introduction of the ambient-light sensing stage LS, the ambient-light sensing stage LS and the front and rear corridor stage D0 corresponding to the display stage may overlap with each other, that is, at least part of the time corresponding to the front and rear corridor stage D0 may be used to perform the ambient-light sensing, which may not increase the complexity of the driving period T while realizing the ambient-light sensing function.

In addition, the first light-sensing units used for ambient-light sensing according to the present disclosure may be multiplexed from the fingerprint recognition units. When a part of the fingerprint recognition units is multiplexed as the first light-sensing units, this part of fingerprint recognition units may perform the fingerprint image acquisition process and the ambient light-sensing process in a time-sharing manner. That is, this part of fingerprint recognition units may perform the fingerprint recognition function in the fingerprint recognition stage FPR, and perform the ambient-light sensing function in the ambient light-sensing stage. Therefore, the display panel may not need to be provided with a new structure for the first light-sensing units, and the existing fingerprint recognition units may be multiplexed as the first light-sensing units, so that the fingerprint recognition units may be able to perform both the fingerprint image acquisition function and the ambient-light sensing function. As such, the disclosed display panel may not only have the fingerprint recognition function and the ambient-light sensing function, but also be conducive to simplifying the product structure and the simplifying the product manufacturing process.

Referring to FIG. 14, in one embodiment, in at least one driving period T, the ambient light-sensing stage LS may be located within the range defined by the front and rear corridor stage D0. For example, the ambient light-sensing stage LS may be set within the range defined by the front and rear corridor stage D0, that is, the ambient light-sensing process may be completely executed in the front and rear corridor stage D0 of the display stage, and the front and rear corridor stage D0 may be multiplexed for ambient-light sensing. Thus, there is no need to introduce a new time period in each driving period T as the ambient light-sensing stage LS, and the ambient light-sensing stage may not occupy the time corresponding to the display scanning stage D1. Therefore, neither the display time is occupied nor the length of a single driving period T is increased, and the ambient-light sensing function of the display device is also realized.

Figure 15:
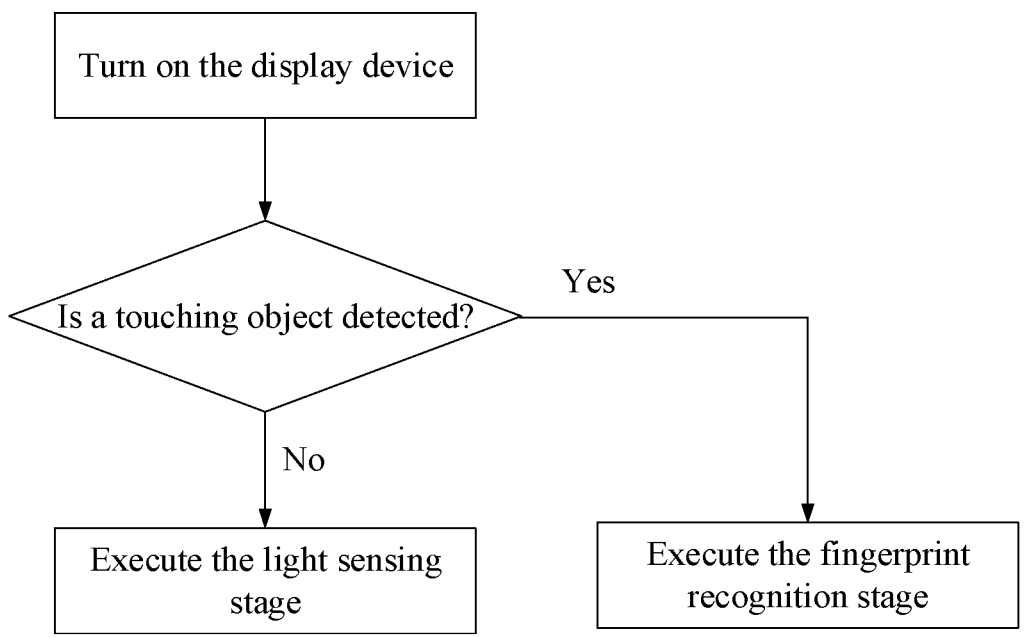
FIG. 15 illustrates a flowchart of an exemplary control method for a display device according to various embodiments of the present disclosure.

FIG. 15 illustrates a flowchart of an exemplary control method for a display device according to various embodiments of the present disclosure. Referring to FIG. 15, in one embodiment, when the display device is turned on, the control method may include an exemplary step of determining whether a touching object touches the display device. When determining that a touching object touches the display device, the fingerprint recognition stage may be executed, and when determining that no touching object touches the display device, the ambient light-sensing stage may be executed.

For example, when the display device is turned on, the control method may include further determining the operating mode of the fingerprint recognition units by judging whether there is a touching object on the display device. When determining that there is a touching object on the display device, a fingerprint recognition process may be automatically performed, and the fingerprint recognition units may be used to collect fingerprint information. When there is no touching object on the display device, a light sensing process may be automatically performed, and the fingerprint recognition units may be multiplexed as the first light-sensing units for ambient-light sensing. Determining the operating mode of the fingerprint recognition units according to the touching object may be conducive to simplifying the driving control complexity of the driving method of the disclosed display device.

Figure 16:
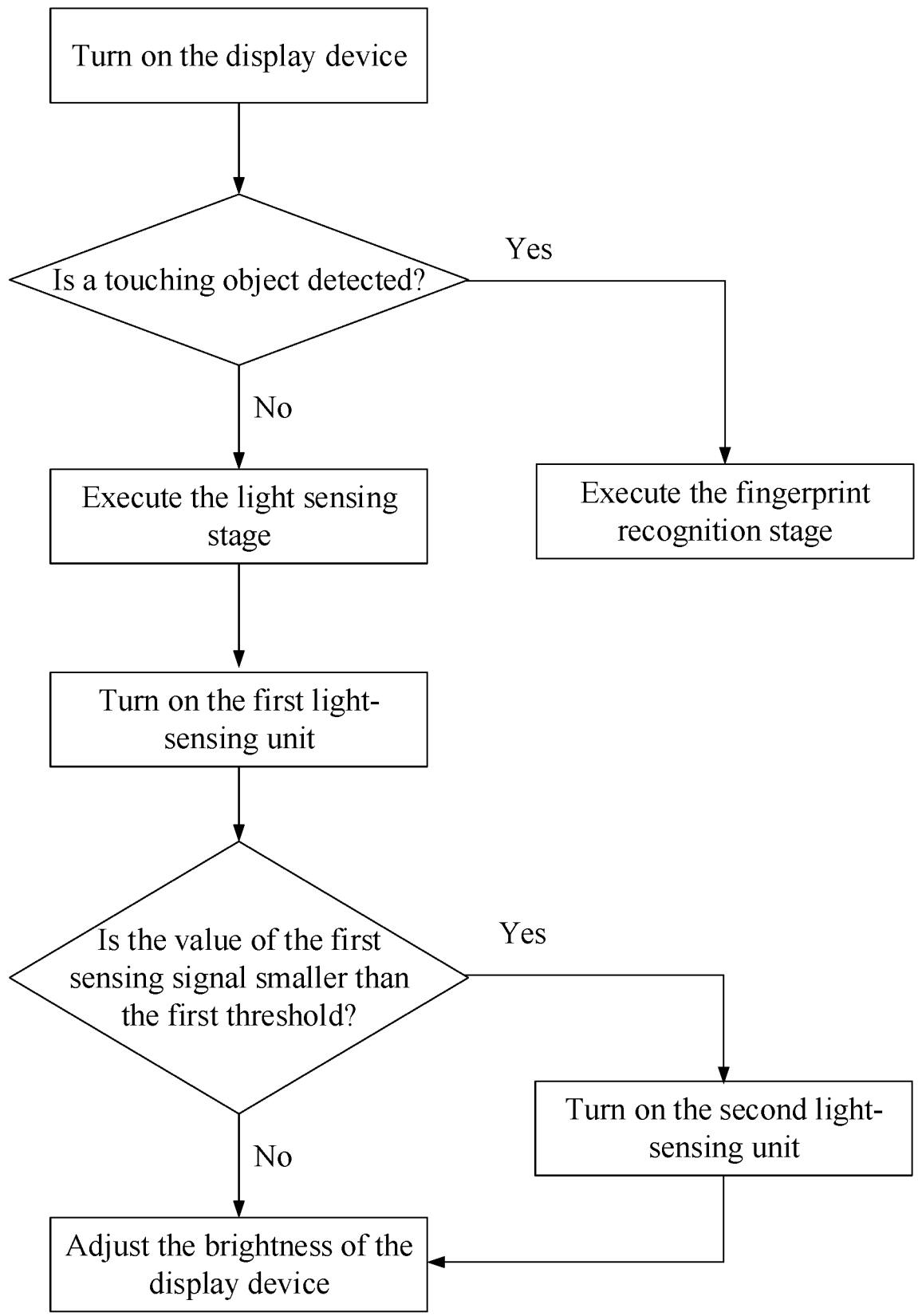
FIG. 16 illustrates a flowchart of another exemplary control method for a display device according to various embodiments of the present disclosure.

FIG. 16 illustrates a flowchart of another exemplary control method for a display device according to various embodiments of the present disclosure. Referring to FIGS. 3-4 and 16, the display device 200 may further include at least one second light-sensing unit 22. The first light-sensing unit 21 may include a first storage capacitor, and the second light-sensing unit 22 may include a second storage capacitor. The capacitance value of the first storage capacitor may be smaller than the capacitance value of the second storage capacitor.

In the ambient light-sensing stage LS, the first light-sensing unit 21 may be controlled to be turned on for conduction, such that the first light-sensing unit 21 may perform light sensing and generate a first sensing signal.

Further, whether the second light-sensing unit 22 needs to be turned on for conduction may be determined according to the first sensing signal. When the value of the first sensing signal is less than or equal to a first threshold, the second light-sensing unit 22 may be turned on for conduction, and the first light-sensing unit 21 may be turned off, such that the second light-sensing unit 22 may perform light sensing and generate a second sensing signal. When the value of the first sensing signal is greater than the first threshold, the first light-sensing unit 21 may continue to perform light sensing.

For example, in a display device according to various embodiments of the present disclosure, two types of light-sensing units may be provided, namely the first light-sensing unit 21 and the second light-sensing unit 22. The capacitance corresponding to the first light-sensing unit 21 may be less than the capacitance corresponding to the second light-sensing unit 22, and the intensity of the ambient light that can be sensed by the first light-sensing unit 21 may be less than the intensity of the ambient light that can be sensed by the second light-sensing unit 22. According to the disclosed driving method of the display device 200, when performing ambient-light sensing, the first light-sensing unit 21 may be turned on first to perform ambient-light sensing. When the value of the first sensing signal generated by the first light-sensing unit 21 is greater than a first threshold, the light intensity corresponding to the ambient light may be determined to not exceed the range that the first light-sensing unit 21 can sense. As such, using the first light-sensing unit 21 to perform light sensing may be enough, and there is no need to turn on the second light-sensing unit 22 which corresponds to the second storage capacitor with a larger capacitance, thereby conducive to save power consumption of the display device. When the value of the first sensing signal generated by the first sensing unit 21 is less than the first threshold, the ambient light may be determined to exceed the range that can be sensed by the first light-sensing unit 21. At this time, the second light-sensing unit 22 may be selected for ambient-light sensing, thereby realizing the light sensing function for strong ambient light.

In one embodiment, the above-mentioned first threshold may be a value close to 0. For example, the first threshold may be 0.2 V. A value of the first sensing signal greater than 0.2 V may indicate that the intensity of the ambient light does not exceed the range that can be sensed by the first light-sensing unit 21. When the value of the first sensing signal is less than or equal to 0.2 V, that is, close to 0, no matter how large the light intensity is, the value of the first sensing signal may no longer change, indicating that the intensity of the ambient light has exceeded the range that can be sensed by the first light-sensing unit 21. Therefore, the second light-sensing unit 22 may be needed for performing ambient-light sensing.

In one embodiment, the number of first light-sensing units that are turned on for conduction during the ambient-light sensing stage may be smaller than the number of the fingerprint recognition units that are turned on for conduction during the fingerprint recognition stage. That is, in the ambient-light sensing stage, only a part of the fingerprint recognition units may be selectively turned on for conduction to serve as first light-sensing units for ambient-light sensing. It is not necessary to multiplex all the fingerprint recognition units as the first light-sensing units to perform ambient-light sensing, thereby conducive to saving the power consumption of the display device in the ambient-light sensing stage.

Referring to FIG. 16, in one embodiment, the control method for the display device may further include adjusting the brightness of the display device according to the first sensing signal or the second sensing signal. For example, in the ambient-light sensing stage, when the ambient-light sensing can be achieved by the first light-sensing units, the brightness of the display device may be adjusted according to the first sensing signal generated by the first light-sensing units to make the display brightness of the display device closer to the brightness of the ambient light. As such, while protecting the human eyes, the disclosed control method may also be conducive to enhancing the user's visual experience. Similarly, when the ambient light is detected by the second light-sensing units, the brightness of the display device may be adjusted according to the second sensing signal generated by the second light-sensing units to make the display brightness of the display device closer to the brightness of the ambient light, which may also be conducive to enhancing the user's visual experience.

It should be noted that in a case where the display device is an LCD device, when the brightness of the display device is adjusted according to the first sensing signal or the second sensing signal, the brightness of the backlight module in the LCD device may be adjusted. In a case where the display device is an OLED display device, a Mini-LED display device, or a Micro-LED display device, when the brightness of the display device is adjusted according to the first sensing signal or the second sensing signal, the brightness of the light-emitting elements (OLED display device, Mini-LED, or Micro-LED) may be adjusted to make the display brightness of the display device adapt to the brightness of the ambient light, thereby enhancing the user's visual experience.

Compared to existing display panels, display devices, and control method, the disclosed display panel, display device, and control method may demonstrate the following exemplary advantages.

The disclosed display panel and display device include a plurality of sub-pixels and a plurality of fingerprint recognition units arranged in the display region. The plurality of sub-pixels is used to implement picture display, and the plurality of fingerprint recognition units is used to collect fingerprint images and realize identity recognition. The display panel further includes a plurality of ambient light-sensing units, and the plurality of ambient light-sensing units includes at least one first light-sensing unit. The first light-sensing unit is used to sense the brightness of the ambient light. The display brightness of the display panel and the display device can be adaptively adjusted according to the brightness of the ambient light. Moreover, according to the disclosed display panel and display device, at least a part of the plurality of fingerprint recognition units is multiplexed as first light-sensing units. That is, there is no need to introduce a new structure in the display panel as the first light-sensitive units, and the existing fingerprint recognition units can be multiplexed as first light-sensing units. As such, the fingerprint recognition units have both the fingerprint image acquisition function and the ambient-light sensing function. Therefore, while having both the fingerprint recognition function and the ambient light-sensing function, the disclosed display panel and the disclosed display device are also conducive to simplifying the product structure and simplifying the product manufacturing process.

According to the disclosed control method for the display device, the control method includes a plurality of driving periods, and each driving period includes a display stage and a fingerprint recognition stage. The display stage includes a front and rear corridor stage and a display scanning stage. At least a part of the driving period also includes an ambient-light sensing stage. Further, in at least one driving period, the display scanning stage, the fingerprint recognition stage, and the ambient-light sensing stage are performed in a time-sharing manner, and the ambient-light sensing stage overlaps with the front and rear corridor stage. That is, the front and rear corridor stage is used for ambient-light sensing. The use of the front and rear corridor stage for ambient-light sensing does not increase the time of each driving period, so that the ambient-light sensing function is realized without affecting the normal display.

It should be noted that the embodiments described above provide various implementations for improving the strength and wear resistance of the protective film in rollable screens, and also provide various implementations for adjusting the edge segment difference between the protective film and the telescopic bracket. Those skilled in the art may make any reasonable selection according to the actual rollable screen structure, which is not limited by the present disclosure.

It should be noted that the above are only some embodiments of the present disclosure and the applied technical principles. Those skilled in the art shall understand that the present disclosure is not limited to the specific embodiments described herein, and various obvious changes, readjustments, combinations and substitutions can be made without departing from the protection scope of the present disclosure. Therefore, although the present disclosure has been described in detail through the above embodiments, the present disclosure is not limited to the above embodiments, and can also include other equivalent embodiments without departing from the principle of the present disclosure. Any equivalent or modification thereof, without departing from the spirit and principle of the present disclosure, falls within the true scope of the present disclosure.

What is claimed is:

1. A display panel, having a display region and a non-display region and comprising: a plurality of sub-pixels, located in the display region; a plurality of fingerprint recognition units, located in the display region; ambient-light sensing units, including at least one first light-sensing unit, wherein: at least a part of the plurality of fingerprint recognition units is multiplexed as the at least one first light-sensing unit, wherein each driving period of a plurality of driving periods includes a finger print recognition stage, an ambient light sensing stage, and a display stage which includes a front and rear corridor stage and a display scanning stage, and the ambient light sensing stage overlaps with the front and rear corridor stage.

2. The display panel according to claim 1, wherein:
the ambient-light sensing units further includes at least one second light-sensing unit, wherein:
  each first light-sensing unit of the at least one first light-sensing unit includes a first storage capacitor;
  each second light-sensing unit of the at least one second light-sensing unit includes a second storage capacitor; and
  a capacitance value of the first storage capacitor is smaller than a capacitance value of the second storage capacitor.

3. The display panel according to claim 2, wherein:
the capacitance value of the first storage capacitor is greater than or equal to 10 fF and less than or equal to 50 fF; and
the capacitance value of the second storage capacitor is greater than 50 fF and less than or equal to 300 fF.

4. The display panel according to claim 2, wherein:
the display region includes a first display region and a second display region, wherein:
  a pixel aperture ratio of the first display region is greater than a pixel aperture ratio of the second display region; and
  the at least one second light-sensing unit is located in the second display region.

5. The display panel according to claim 4, wherein:
the second display region includes an arc-shaped edge.

6. The display panel according to claim 2, wherein:
the at least one second light-sensing unit is located in the non-display region.

7. The display panel according to claim 2, wherein:
the display panel further includes an array substrate, a color filter substrate arranged opposite to the array substrate, and liquid crystals filled between the array substrate and the color filter substrate; and
the plurality of fingerprint recognition units is integrated in the array substrate, the color filter substrate includes a plurality of fingerprint recognition openings, in a direction perpendicular to a light-emitting surface of the display panel, the plurality of fingerprint recognition units overlaps with the plurality of fingerprint recognition openings.

8. The display panel according to claim 7, wherein:
the at least one second light-sensing unit is integrated in the array substrate, the color filter substrate includes at least one light-sensing opening, and in the direction perpendicular to the light-emitting surface of the display panel, the at least one second light-sensing unit overlaps with the at least one light-sensing opening.

9. The display panel according to claim 1, wherein:
the non-display region includes a bonding region, the bonding region including a plurality of conductive pads;
the display region includes a plurality of first data lines arranged in a first direction and extending in a second direction, wherein the first direction and the second direction intersect each other, and a same first data line is electrically connected to a plurality of sub-pixels located in different rows;
the display region includes a plurality of second data lines arranged in the first direction and extending in the second direction, wherein each fingerprint recognition unit includes a fingerprint recognition sensor, and a same second data line is electrically connected to a plurality of fingerprint recognition sensors located in different rows; and
the display panel further includes a switch circuit, wherein at least one first data line of the plurality of first data lines and at least one second data line of the plurality of second data lines are connected to a same conductive pad through the switch circuit.

10. The display panel according to claim 7, wherein:
the switch circuit includes a plurality of switch groups, each switch group including at least one first switch and at least one second switch;
in the plurality of switch groups, first terminals of first switches are electrically connected to the plurality of first data lines in a one-to-one correspondence;
in the plurality of switch groups, first terminals of second switches are electrically connected to the plurality of second data lines in a one-to-one correspondence; and
in a same switch group, a second terminal of each first switch of the at least one first switch and a second terminal of each second switch of the at least one second switch are connected to the same conductive pad; and
in the same switch group, the at least one first switch and the at least one second switch are turned on for conduction in a time-sharing manner.

11. The display panel according to claim 10, wherein:
each switch group includes a plurality of first switches;
in a same switch group, the plurality of first switches are turned on for conduction in a time-sharing manner.

12. The display panel according to claim 1, wherein:
the display panel further includes a driving circuit layer, a light-emitting element layer, and an encapsulation layer, wherein the driving circuit layer, the light-emitting element layer, and an encapsulation layer are arranged as a stack structure with the light-emitting element layer located between the driving circuit layer and the encapsulation layer; and
the plurality of fingerprint recognition units is integrated in the driving circuit layer, the light-emitting layer includes a plurality of fingerprint recognition openings, and in a direction perpendicular to a light-emitting surface of the display panel, the plurality of fingerprint recognition units overlaps with the plurality of fingerprint recognition openings.

13. A display device, comprising a display panel, wherein:
the display panel is provided with a display region and a non-display region and includes: a plurality of sub-pixels, located in the display region; a plurality of fingerprint recognition units, located in the display region; ambient-light sensing units, including at least one first light-sensing unit, wherein: at least a part of the plurality of fingerprint recognition units is multiplexed as the at least one first light-sensing unit, wherein each driving period of a plurality of driving periods includes a finger print recognition stage, an ambient light sensing stage, and a display stage which includes a front and rear corridor stage and a display scanning stage, and the ambient light sensing stage overlaps with the front and rear corridor stage.

14. A control method for a display device, wherein:
the display device includes a display panel, provided with a display region and a non-display region and including:
  a plurality of sub-pixels, located in the display region;
  a plurality of fingerprint recognition units, located in the display region;
  ambient-light sensing units, including at least one first light-sensing unit, wherein:

at least a part of the plurality of fingerprint recognition units is multiplexed as the at least one first light-sensing unit, the control method includes a plurality of driving periods, each driving period including a display stage and a fingerprint recognition stage, wherein at least a part of the driving period further includes an ambient-light sensing stage, and the display stage includes a front and rear corridor stage and a display scanning stage; and in at least one driving period of the plurality of driving periods, the display scanning stage, the fingerprint recognition stage, and the ambient light-sensing stage are executed in a time-sharing manner, and the ambient-light sensing stage overlaps with the front and rear corridor stage.

15. The control method according to claim 14, wherein:
in at least one driving period of the plurality of driving periods, the ambient-light sensing stage is located within a range defined by the front and rear corridor stage.

16. The control method according to claim 14, when the display device is turned on, including:
determining whether a touching object touches the display device; and
in response to determining that a touching object touches the display device, executing the fingerprint recognition stage, and in response to determining that no touching object touches the display device, executing the ambient-light sensing stage.

17. The control method according to claim 16, wherein:
the ambient-light sensing units of the display panel further include at least one second light-sensing unit, wherein:
each first light-sensing unit of the at least one first light-sensing unit includes a first storage capacitor,
each second light-sensing unit of the at least one second light-sensing unit includes a second storage capacitor, and
a capacitance value of the first storage capacitor is smaller than a capacitance value of the second storage capacitor;

in the ambient-light sensing stage, the control method includes:
controlling the at least one first light-sensing unit to be turned on for conduction, performing light sensing using the at least one first light-sensing unit, and generating a first sensing signal;
determining whether the at least one second light-sensing unit needs to be turned on for conduction according to the first sensing signal;
in response to determining a value of the first sensing signal smaller than or equal to a first threshold, turning on the at least one second light-sensing unit for conduction and turning off the at least one first light-sensing unit, performing light sensing using the at least one second light-sensing unit, and generating a second sensing signal; and
in response to determining the value of the first sensing signal greater than the first threshold, continuing to perform light sensing using the at least one first light-sensing unit.

18. The control method according to claim 17, wherein:
a quantity of first light-sensing units that are turned on for conduction during the ambient-light sensing stage is less than a quantity of fingerprint recognition units that are turned on for conduction during the fingerprint recognition stage.

19. The control method according to claim 17, further including:
adjusting display brightness of the display device according to the first sensing signal or the second sensing signal.

* * * * *